United States Patent
Bharti et al.

(10) Patent No.: US 11,689,020 B2
(45) Date of Patent: Jun. 27, 2023

(54) COMPUTER MODELING TO ANALYZE ELECTRICAL USAGE IN AN ELECTRICAL GRID FOR FACILITATING MANAGEMENT OF ELECTRICAL TRANSMISSION

(71) Applicant: International Business Machines Corporation, Armonk, NY (US)

(72) Inventors: Harish Bharti, Pune (IN); Rajesh Kumar Saxena, Maharashtra (IN); Jitendra Hairiya, Ghaziabad (IN); Sandeep Sukhija, Rajasthan (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/303,090

(22) Filed: May 19, 2021

(65) Prior Publication Data

US 2022/0376505 A1  Nov. 24, 2022

(51) Int. Cl.
*H02J 3/14* (2006.01)
*G05B 13/04* (2006.01)

(52) U.S. Cl.
CPC ............ *H02J 3/144* (2020.01); *G05B 13/048* (2013.01); *H02J 2203/20* (2020.01)

(58) Field of Classification Search
CPC ...... H02J 3/144; H02J 2203/20; G05B 13/048
USPC ....................................................... 700/291
See application file for complete search history.

(56) References Cited

U.S. PATENT DOCUMENTS

| 8,417,391 | B1 | 4/2013 | Rombouts |
| 2007/0285079 | A1 | 12/2007 | Nasle |
| 2011/0071882 | A1 | 3/2011 | Jakagnanam |
| 2014/0297206 | A1 | 10/2014 | Silverman |
| 2016/0105023 | A1 | 4/2016 | De Ridder |
| 2016/0246904 | A1 | 8/2016 | Meagher |

(Continued)

FOREIGN PATENT DOCUMENTS

| CN | 101145225 A | 3/2008 |
| CN | 107196294 A | 9/2017 |

(Continued)

OTHER PUBLICATIONS

IEEE (Short-Term Demand Forecast Using Fourier Series, By: Laura M. Cruz) (Year: 2019).*

(Continued)

*Primary Examiner* — Jigneshkumar C Patel
(74) *Attorney, Agent, or Firm* — Michael A. Petrocelli

(57) ABSTRACT

A model is generating for predicting energy workloads to adjust electrical energy supply to meet varying short-term energy demands at a microcosm level. A model is developed, using a computer, to facilitate predicting energy workloads for adjusting energy supplies to meet an energy demand. The model includes receiving, at the computer, input parameters of dynamic values of workloads as historical data, and generating a predictive model by analyzing the input parameters. The model further includes predicting short-term energy demands based on the predictive model, the predicted short-term energy demands include identifying a predicted peak value. Also, the model includes initiating short term energy output in an electrical grid to a transformer level component in the electrical grid based on the predicted short term energy demands.

20 Claims, 12 Drawing Sheets

(56) References Cited

U.S. PATENT DOCUMENTS

| | | | |
|---|---|---|---|
| 2019/0064757 A1 | 2/2019 | Ramamurthy | |
| 2019/0081476 A1 | 3/2019 | Konya | |
| 2019/0089159 A1 | 3/2019 | Bhageria | |
| 2019/0384259 A1 | 12/2019 | Wenzel | |
| 2020/0041972 A1* | 2/2020 | Hong | G05B 19/0428 |
| 2020/0184395 A1 | 6/2020 | Fabris | |
| 2021/0182980 A1* | 6/2021 | Rahman | G06Q 10/067 |

FOREIGN PATENT DOCUMENTS

| | | |
|---|---|---|
| EP | 3493344 A1 | 6/2019 |
| WO | 2018144009 A1 | 8/2018 |

OTHER PUBLICATIONS

IEEE (Short-Term Scheduling and Control of Active Distribution Systems With High Penetration of Renewable Resources, By: Alberto Borghetti, IEEE Systems Journal, vol. 4, No. 3, Sep. 2010) (Year: 2010).*

"OptGrid Controls Distributed Energy Resources for Grid Optimization", NREL, last printed Oct. 8, 2021, 3 pages, <https://www.nrel.gov/grid/optgrid-controls.html>.

Alazab, et al., "A Multidirectional LSTM Model for Predicting the Stability of a Smart Grid", IEEE Access, vol. 4, 2019, 10 pages, <https://ieeexplore.ieee.org/document/9079864>.

Chen, et al., "Internet of Things Based Smart Grids Supported by Intelligent Edge Computing", IEEE Access, vol. 7, Jun. 2019, pp. 74089-74102, <https://www.researchgate.net/publication/344333903>.

List of IBM Patents or Patent Applications Treated as Related. Filed Herewith. 2 pages.

Prabadevi B, et al., "Deep Learning for Intelligent Demand Response and Smart Grids: A Comprehensive Survey", arXiv:2101.08013v1, Jan. 20, 2021, 25 pages, <https://arxiv.org/pdf/2101.08013.pdf>.

Saxena, et al., "Analyzing Electrical Usage in an Electrical Grid for Facilitating Management of Electrical Transmission", U.S. Appl. No. 17/450,443, filed Oct. 8, 2021.

Trudnowski, et al., "Real-Time Very Short-Term Load Prediction for Power-System Automatic Generation Control", IEEE Transactions on Control Systems Technology, vol. 9, No. 2, Mar. 2001, p. 254-260, <https://ieeexplore.ieee.org/document/911377>.

Mell, et al., "The NIST Definition of Cloud Computing", National Institute of Standards and Technology, Special Publication 800-145, Sep. 2011, 7 pages.

Bharti, et al., "Computer Modeling to Analyze Electrical Usage in an Electrical Grid Forfacilitating Management of Electrical Transmission", International Application No. PCT/CN2022/084349, International Filing Date Mar. 31, 2022, 72 pages.

International Search Report and Written Opinion, International Application No. PCT/CN2022/084349, dated Jun. 15, 2022, 9 pages.

International Searching Authority, "Notification of International Search Report and Written Opinion or Declaration", International Application No. PCT/CN2022/114442, dated Nov. 1, 2022, 9 pages.

* cited by examiner

COMPUTER MODELING TO ANALYZE ELECTRICAL USAGE IN AN ELECTRICAL GRID FOR FACILITATING MANAGEMENT OF ELECTRICAL TRANSMISSION

BACKGROUND

The present disclosure relates to generating a computer simulation or model to analyze electrical usage in an electrical grid for facilitating management of electrical transmission in the electrical grid, and more particularly, short-term electrical transmission.

Electrical power grids for conducting electricity from a power plant to a number of destinations can include a number of components known in the industry, such as transformers. Open market operations for delivering electricity have latent inefficiencies that percolate down to the transformer level. These inefficiencies can be represented as penalties and can be used in energy demand guidance.

In one example, electrical peak demands and workloads (or workload demands) can be referred to as barriers. Multiple-barriers or workloads can be associated with a power grid and energy demands can be predicted. In one example, power loads cannot be changed from a transformer in very short time (or short time epochs). Current techniques can result in inaccurate identification of electric energy which can result in commercial losses. There is a need to develop a framework to adapt energy prediction for accuracy for providing electrical energy to an end point based on available data and considering constraints. In another example, a stochastic model can be used for determining day ahead/spot market energy prices.

Current solutions may identify a target customer to meet energy demand during a peak time. Such identification can be based on customer profiling associated at a micro-grid to achieve the target energy consumption. In this example, a customer needs to be responsive, and further increased pressure can be put on distributors to meets energy demands.

SUMMARY

The present disclosure recognizes the shortcomings and problems associated with current techniques for generating a model for predicting energy workloads to adjust electrical energy supply to various end points or nodes.

The present invention provides a framework to load various barriers as an input and find an optimal solution that is refined for reference datasets over time.

Multiple-barriers can be associated while predicting an energy demand, and the barriers can change over time, including when the system is going to predict a demand. For example, a load cannot be changed from the transformer to an end point or receiving system in a short period of time or short time epochs. The predicted values can be a sub-set or co-relation with past values which are dynamic in nature from a machine learning perspective. Since these constraints will be applicable for smaller parts (subsystems) of a large system, a method and system according to the present invention can enhance the accuracy of the energy demand profiling system by employing behavior modeling within such constraints. Using the present method and system a high probability of accurate identification of electric energy usage and needs which can result in commercial successes. In one example according to the present invention the method and system can penalize certain energy transmissions and develop a framework to improvise energy transmission with accuracy based on available data and considering the constraints.

In an aspect according to the present invention, a computer-implemented method is disclosed for generating a model for predicting energy workloads to adjust electrical energy supply to meet varying short-term energy demands at a microcosm level. The method includes developing a model, using a computer, to facilitate predicting energy workloads for adjusting energy supplies to meet an energy demand, the model includes the following. The method include receiving, at the computer, input parameters of dynamic values of workloads as historical data, and generating a predictive model by analyzing the input parameters. The method includes predicting short-term energy demands based on the predictive model, the predicted short-term energy demands include identifying a predicted peak value. And the method includes initiating short term energy output in an electrical grid to a transformer level component in the electrical grid based on the predicted short-term energy demands.

In a related aspect, the transformer level component is a transformer.

In a related aspect, the method includes initiating the short-term energy output in the electrical grid using an electrical circuit at a transformer level in the electrical grid; and dynamically configuring control limits to the transformer using the electrical circuit.

In a related aspect, the method further includes initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

In a related aspect, the input parameters include a subset of past values as at least part of the historical data, and the input parameters include associated penalties and other constraints to identify the predicted peak value.

In a related aspect, the input parameters include a plurality of barriers which include, workloads and peak power outputs, past real data of power usage, and cost parameters.

In a related aspect, the predictive model predicts when variables in the electrical gird will reach specified limits, respectively, along a prediction horizon; and the predictive model providing a sequence of control actions to minimize costs, the sequence of control actions corresponding to identified nodes of the prediction horizon, respectively.

In another aspect according to the present invention, a system using a computer for generating a model for predicting energy workloads to adjust electrical energy supply to meet varying short-term energy demands at a microcosm level, includes: a computer system comprising; a computer processor, a computer-readable storage medium, and program instructions stored on the computer-readable storage medium being executable by the processor, to cause the computer system to perform the following functions to; developing a model, using a computer, to facilitate predicting energy workloads for adjusting energy supplies to meet an energy demand, the model includes the following; receiving, at the computer, input parameters of dynamic values of workloads as historical data; generating a predictive model by analyzing the input parameters; predicting short-term energy demands based on the predictive model, the predicted short-term energy demands include identifying a predicted peak value; and initiating short term energy output in an electrical grid to a transformer level component in the electrical grid based on the predicted short term energy demands.

In a related aspect, the transformer level component is a transformer.

In a related aspect, the system includes initiating the short-term energy output in the electrical grid using an electrical circuit at a transformer level in the electrical grid; and dynamically configuring control limits to the transformer using the electrical circuit.

In a related aspect, the system further includes initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

In a related aspect, the input parameters include a subset of past values as at least part of the historical data, and the input parameters include associated penalties and other constraints to identify the predicted peak value.

In a related aspect, the input parameters include a plurality of barriers which include, workloads and peak power outputs, past real data of power usage, and cost parameters.

In a related aspect, the predictive model predicts when variables in the electrical gird will reach specified limits, respectively, along a prediction horizon; and the predictive model providing a sequence of control actions to minimize costs, the sequence of control actions corresponding to identified nodes of the prediction horizon, respectively.

In another aspect according to the present invention, a computer program product is disclosed for predicting energy workloads to adjust electrical energy supply to meet varying short-term energy demands at a microcosm level. The computer program product includes a computer readable storage medium having program instructions embodied therewith. The program instructions executable by a computer to cause the computer to perform functions, by the computer, comprising the functions to: developing a model, using a computer, to facilitate predicting energy workloads for adjusting energy supplies to meet an energy demand, the model includes the following; receiving, at the computer, input parameters of dynamic values of workloads as historical data; generating a predictive model by analyzing the input parameters; predicting short-term energy demands based on the predictive model, the predicted short-term energy demands include identifying a predicted peak value; and initiating short term energy output in an electrical grid to a transformer level component in the electrical grid based on the predicted short term energy demands.

In a related aspect, the transformer level component is a transformer.

In a related aspect, the computer program product further including initiating the short-term energy output in the electrical grid using an electrical circuit at a transformer level in the electrical grid; and dynamically configuring control limits to the transformer using the electrical circuit.

In a related aspect, the computer program product further including initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

In a related aspect, the input parameters include a subset of past values as at least part of the historical data, and the input parameters include associated penalties and other constraints to identify the predicted peak value.

In a related aspect, the input parameters include a plurality of barriers which include, workloads and peak power outputs, past real data of power usage, and cost parameters.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
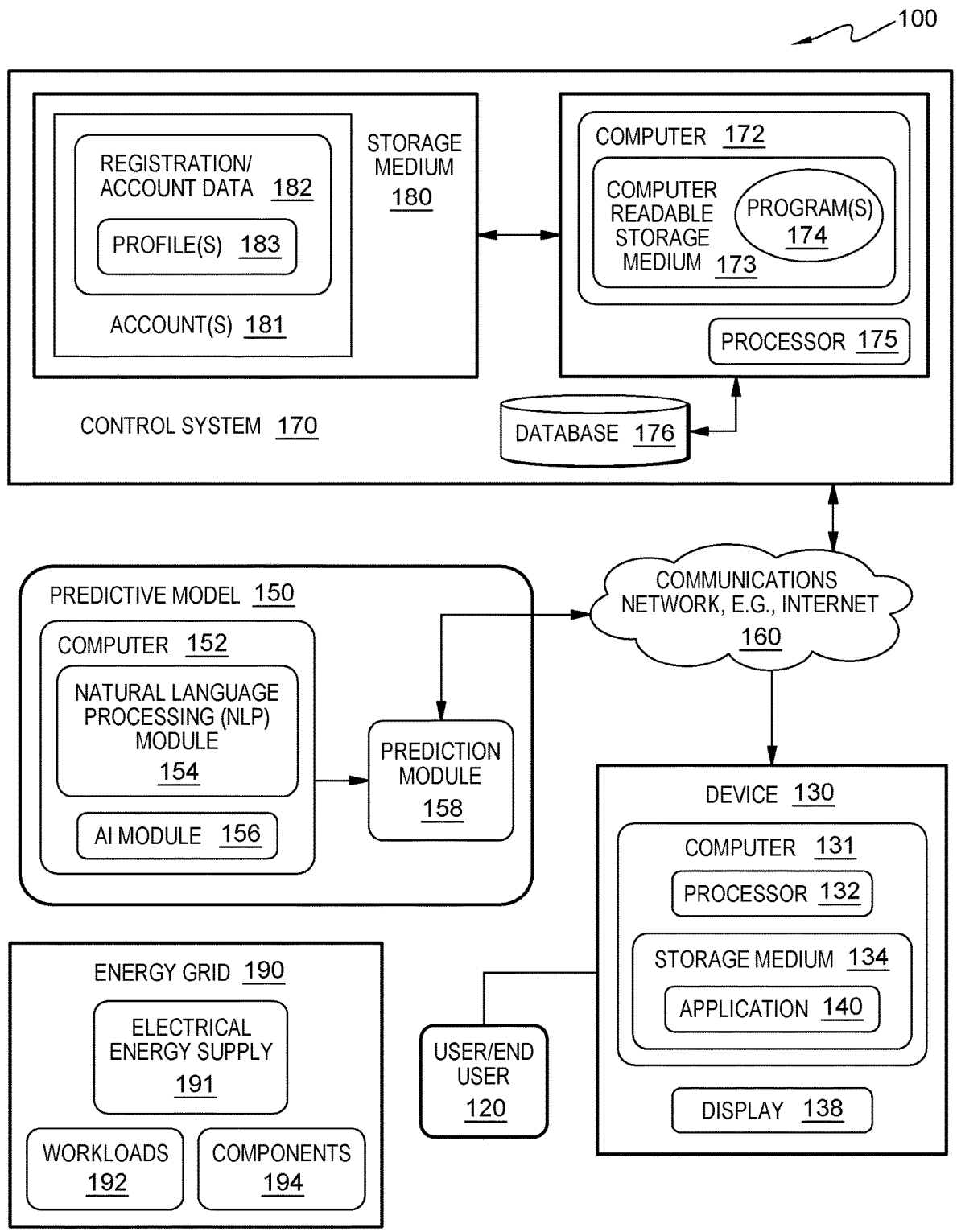
FIG. 1 is a schematic block diagram illustrating an overview of a system, system features or components, and methodology for generating a model for predicting energy workloads to adjust electrical energy supply to meet varying short-term energy demands at a microcosm level, according to an embodiment of the present disclosure.
Figure 2:
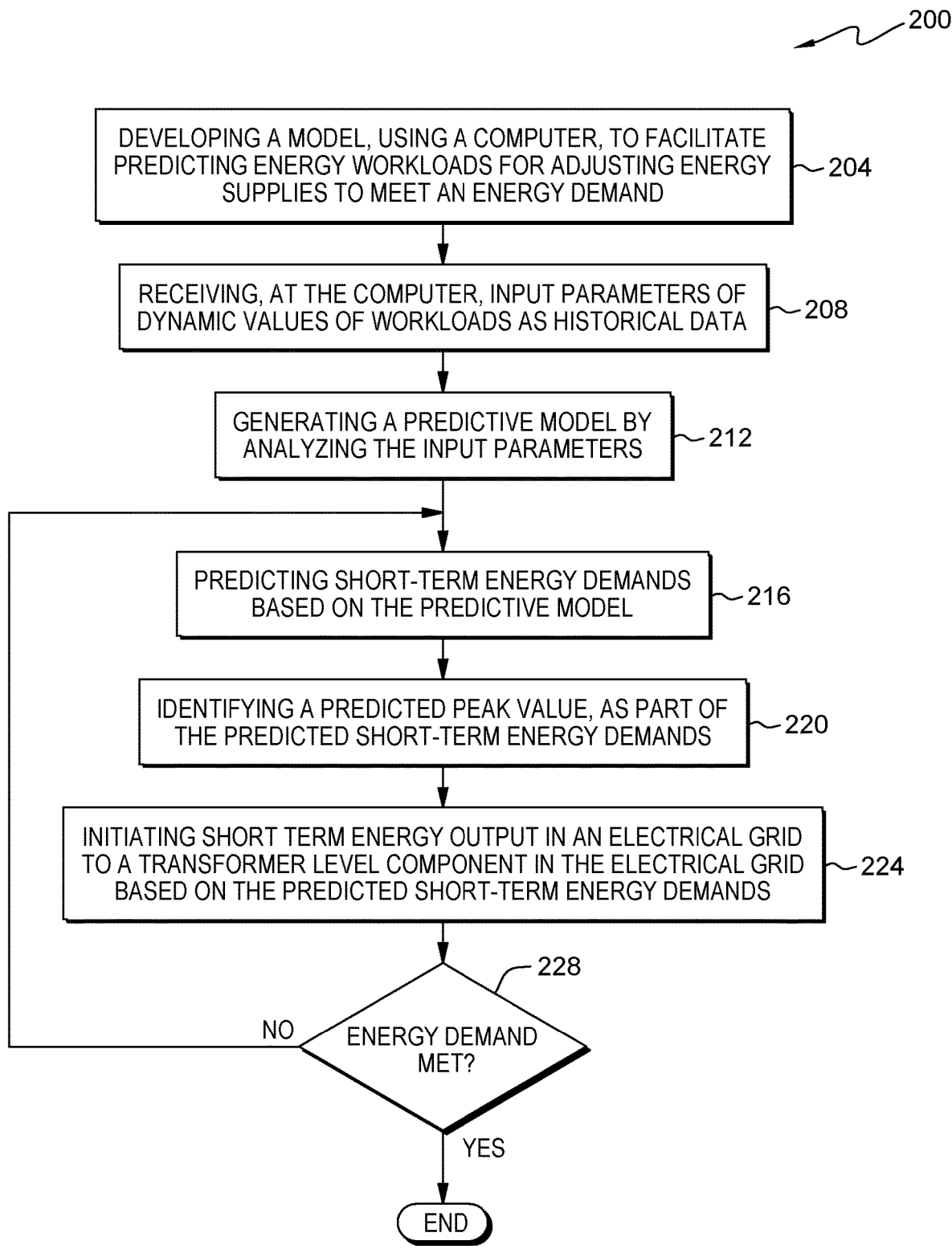
FIG. 2 is a flow chart illustrating a method, implemented using the system shown in FIG. 1, for generating a model for predicting energy workloads to adjust electrical energy supply to meet varying short-term energy demands at a microcosm level, according to an embodiment of the present disclosure.
Figure 3:
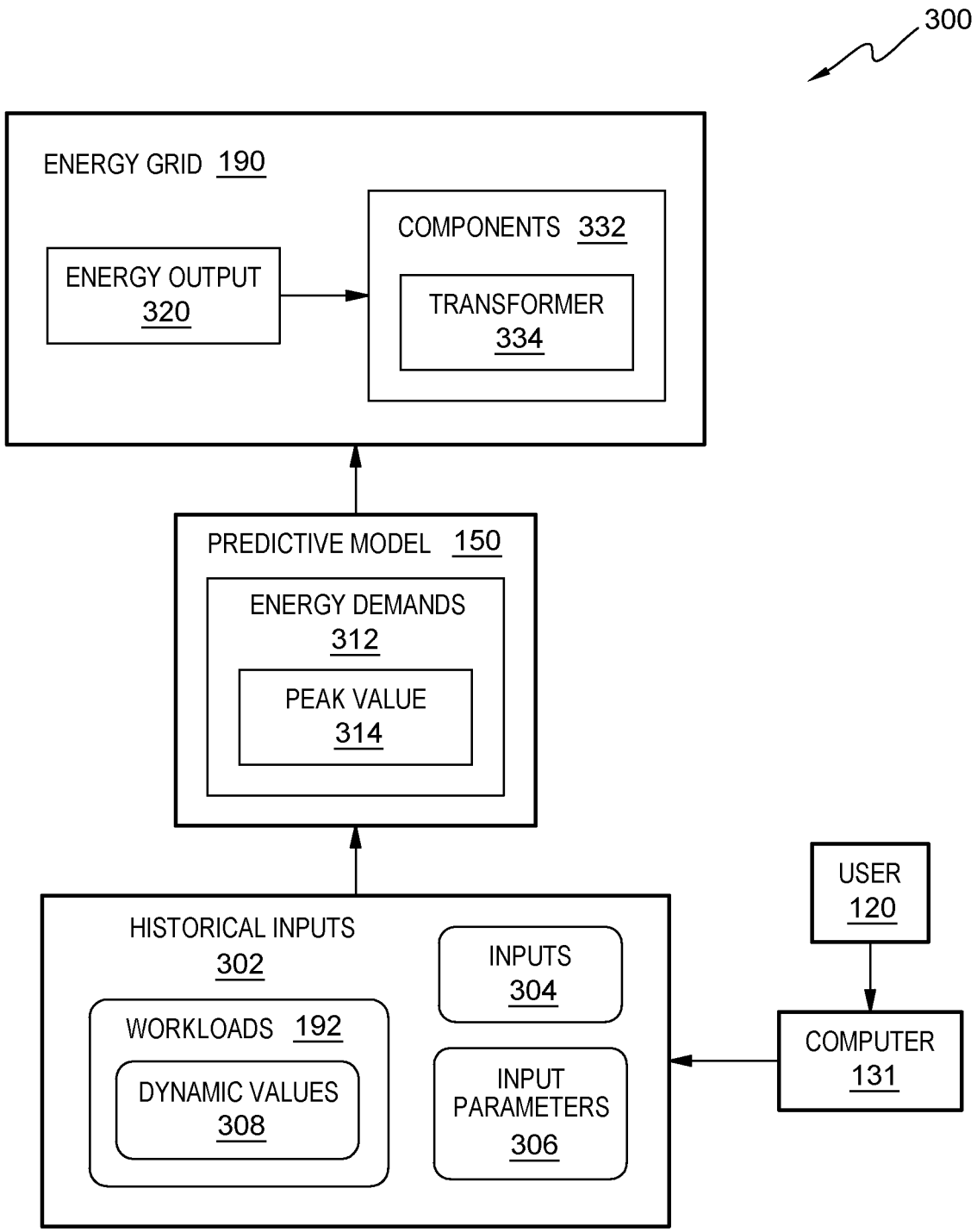
FIG. 3 is a functional schematic block diagram showing a series of operations and functional methodologies, for instructional purposes illustrating functional features of the present disclosure associated with the embodiments shown in the FIGS., for generating a model for predicting energy workloads to adjust electrical energy supply to meet varying short-term energy demands at a microcosm level.

Referring to FIGS. 1, 2 and 3, a computer-implemented method 200 is used for generating a model, such as a predictive model 150, for predicting energy workloads 192 using a prediction module 158 to adjust electrical energy supply 191 to meet varying short-term energy demands or workloads 192 at a microcosm level, according to an embodiment of the present disclosure.

The method 200 includes a-series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The predictive model 150 is developed, using a computer 131 which can be part of a device 130, to facilitate predicting energy workloads 192 for adjusting energy supplies 191 to meet an energy demand or workload 192 for a user or end user 120, as in block 204. The model includes receiving, at the computer 131, inputs 304, including input parameters 306 of dynamic values 308 of workloads 192 as historical data 302, as in block 208.

The method 200 includes generating a predictive model by analyzing the input parameters, as in block 212. The predictive model 150 includes analyzing the input parameters 306 predicting short-term energy demands 312 based on the predictive model 150, as in block 216. The predicted short-term energy demands 312 include identifying a predicted peak value 314, as in block 220.

The method includes initiating short-term energy output 320 in an electrical grid to a transformer level component 332 in the electrical grid 190 based on the predicted short-term energy demands 312, as in block 224.

When the short-term energy output meets the short-term energy demands, in block 228 the method ends. When the short-term energy output does not meet the short-term energy demands, in block 228, the method can return to block 216 to again predict short-term energy demands based on a predictive model.

In one example, the transformer level component can be a transformer 334.

Figure 4A:
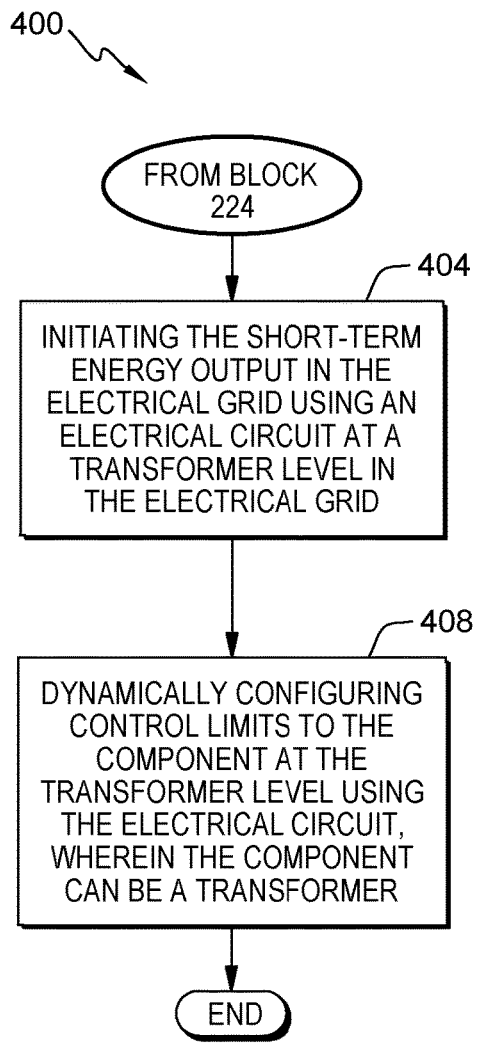
FIG. 4A is a flow chart illustrating another method, which continues from the flow chart of FIG. 2, for generating a model for predicting energy workloads to adjust electrical energy supply to meet varying short-term energy demands at a microcosm level, according to an embodiment of the present disclosure.

Referring to FIG. 4A, in another example, a method 400 can continue from block 224 of the method 200 and can further include initiating the short-term energy output in the electrical grid using an electrical circuit at a transformer level in the electrical grid, as in block 404. Further, the method can dynamically configure control limits to the component at the transformer level using the electrical circuit, as in block 408. In one example, the component can be a transformer.

In another example, the method can further include initiating the short-term energy output in the electrical grid by setting a control limit, using the computer, to a passive branch of a transformer as at least part of an electrical circuit of the electrical grid. The electrical circuit can transmit electricity from a power source to an end user using the electrical grid.

In another example, the method can include input parameters having a subset of past values as at least part of the historical data. The input parameters can include associated penalties and other constraints to identify the predicted peak value.

In another example, the input parameters can include a plurality of barriers which include, workloads and peak power outputs, past real data of power usage, and cost parameters.

Figure 4B:
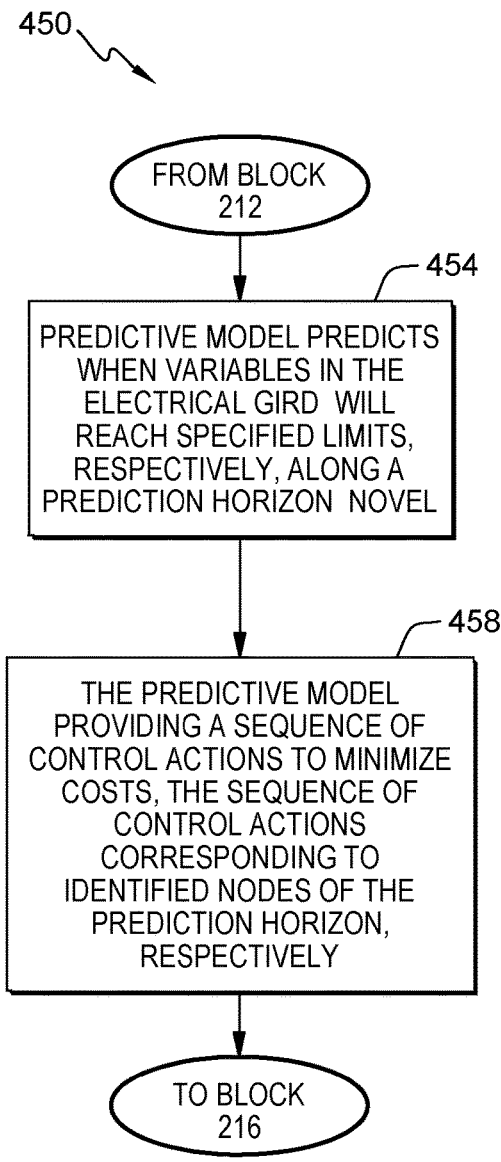
FIG. 4B is a flow chart illustrating another method, which continues from the flow chart of FIG. 2, for generating a model for predicting energy workloads to adjust electrical energy supply to meet varying short-term energy demands at a microcosm level, according to an embodiment of the present disclosure.

Referring to FIG. 4B, in another example, a method 450 includes continuing from block 212 of the method 200, the predictive model can predict when variables in the electrical gird will reach specified limits, respectively, along a prediction horizon, as in block 454. The predictive model can provide a sequence of control actions to minimize costs, the sequence of control actions corresponding to identified nodes of the prediction horizon, respectively, as in block 458.

Other Embodiments and Examples

Referring to FIG. 1, the user device 130 includes a computer 131 having a processor 132 and a storage medium 134 where an application 140, can be stored. The application can embody the features of the method of the present disclosure as instructions. The user can connect to a learning engine 150 using the device 130. The device 130 which includes the computer 131 and a display or monitor 138. The application 140 can embody the method of the present disclosure and can be stored on the computer readable storage medium 134. The device 130 can further include the processor 132 for executing the application/software 140. The device 130 can communicate with a communications network 160, e.g., the Internet.

It is understood that the user device 130 is representative of similar devices which can be for other user, as representative of such devices, which can include, mobile devices, smart devices, laptop computers etc.

In another example and embodiment, profiles can be saved for users/participants. Such profiles can supply data regarding the user and history of deliveries for analysis. When a profile is not found at block 112, the method creates a profile at block 116.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

In other examples and embodiments according to the present disclosure, one or more methods and systems for generating a model for predicting energy workloads to adjust electrical energy supply to meet varying short-term energy demands at a microcosm level can include one or more aspects as discussed below.

In one example, a demand profile can be created at a microcosm level of the electrical grid. In another example, various barriers can be loaded into an input to find an optimal solution that is refined for reference datasets. The solution can be improved over time using error modeling and scalar deformity based differential equation solutions.

In another embodiment, a method and system based on a model to predict peaks and workloads (which can be called barriers) at a microcosm level so that a revised demand profile can be created to supply the energy gap. For example, the microcosm level demand profiling can be at a transformer level. For example, a transformer level can refer to components of the electrical grid, including one or more transformers, operating at the level in the grid of transformers.

The method and system can provide a solution based on an optimal barrier framework considering a subset of past values (for example, historic data), associated penalties and other constraints to identify the predicted peak value. The peak value can go through a cycle to compare reference horizon data value and output of optimal barrier function to detect variation as demand error. The cycle is controlled by a balancer to get the most accurate demand and peak value. The approach of the methods and systems according to the present disclosure can include defining all the variables, building a balancer scalar that ensures that there is convex breakout (for example, no solution found) and this can be tied into a first order differential equation which is solved for consistency (for example, at least one solution exist). The solution can be designed to provide most accurate demand for a specific period as peak demand period.

A method and system or framework according to the present disclosure includes finding and implementing optimal operational actions for short term energy planning and management at a transformer level, based on inputs as various barriers, such as past real data and cost barrier. The framework provides an ability for improvised operations to act upon the impacts created by levied penalties (for example, made available as the stationary point solution for a deferential equation).

Further, an embodiment of the present disclosure can include a barrier managed exhaustion framework and suggested hardware configuration, which can include Introduction of a circuit at transformer level with the ability for dynamic configuration that provides the ability to set the new control limits to the passive branch of the transformer. Further, accept all dynamic values of barriers as input parameter values set on the web server through webserver Interface. Further, a reference horizon and past values are available to a program through persisted data for load functions (through a microcosm of resilient data base structure at transformer level). Also, the provided is the ability to interface with a data storage medium for applying an algorithm to drive operational efficiencies. Additionally, the embodiments can include a framework to control the circuit configuration, directly optimizing the operations to drive efficiencies. The embodiment can use a multi-variable model to adjust control actions (manipulated inputs) and predict the effect of loads (disturbance variables) on outputs (controlled variables). The multi-variable model prediction can determine whether some variables will reach their limits along the prediction horizon. The framework provides a sequence of control actions which move along a control horizon (Nc) such that a cost function defined along a reference horizon (Np) is minimized.

Figure 5:
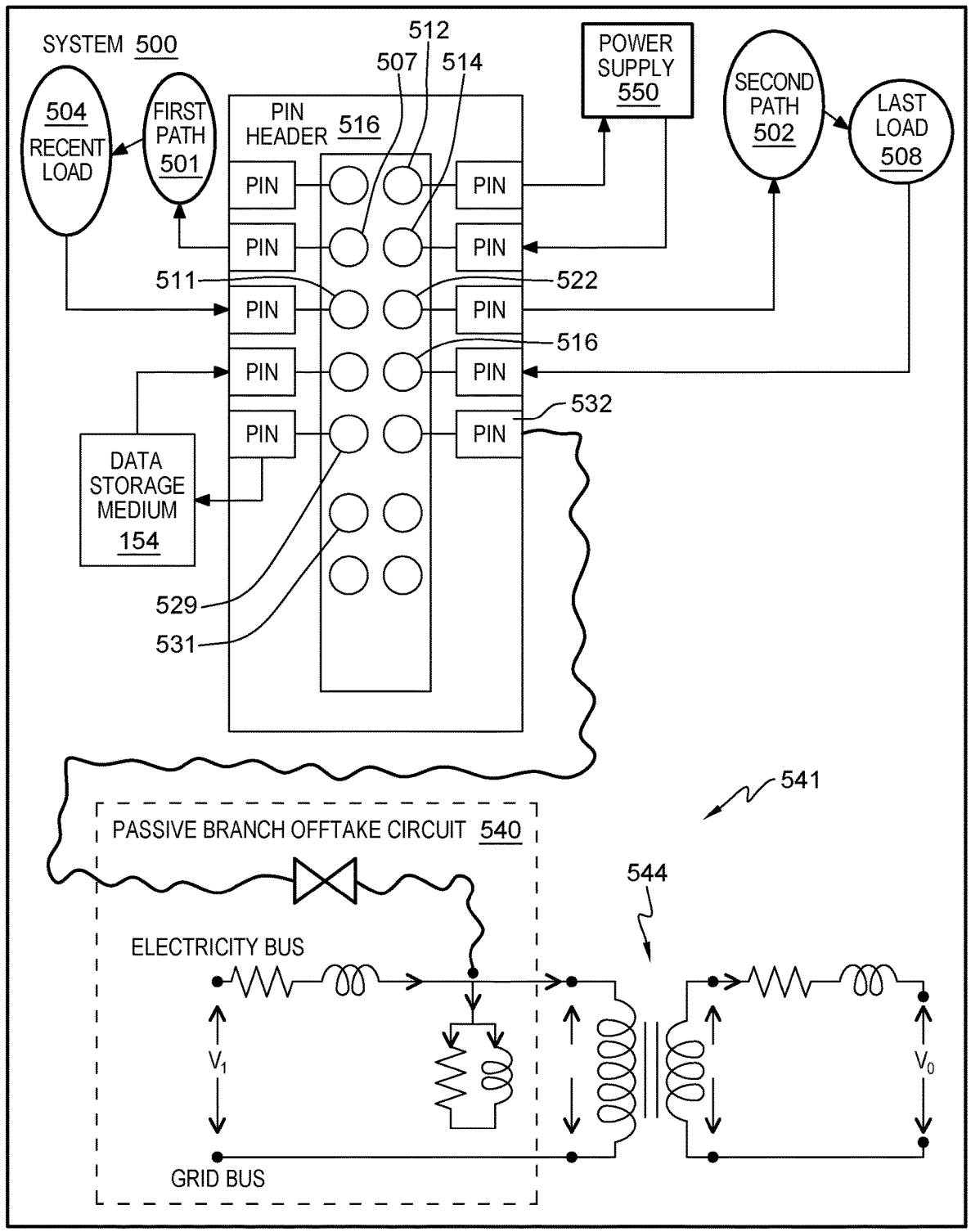
FIG. 5 is a flow chart illustrating another system, which can be implemented, at least in part, in coordination with the system shown in FIG. 1, for generating a model for predicting energy workloads to adjust electrical energy supply to meet varying short-term energy demands at a microcosm level, according to an embodiment of the present disclosure.

Referring to FIG. 5, in one embodiment according to the present disclosure, a system 500 can be referred to as a barrier managed exhaustion (BME) framework which will be hard-bonded on a semiconductor chip having a processor. An application (for example, algorithm/binary) can be available as an instance on computer readable storage medium

524 (for instance a micro-SD (secure digital)) which is interfaced to the processor, such as a dual core processor.

Figure 6:
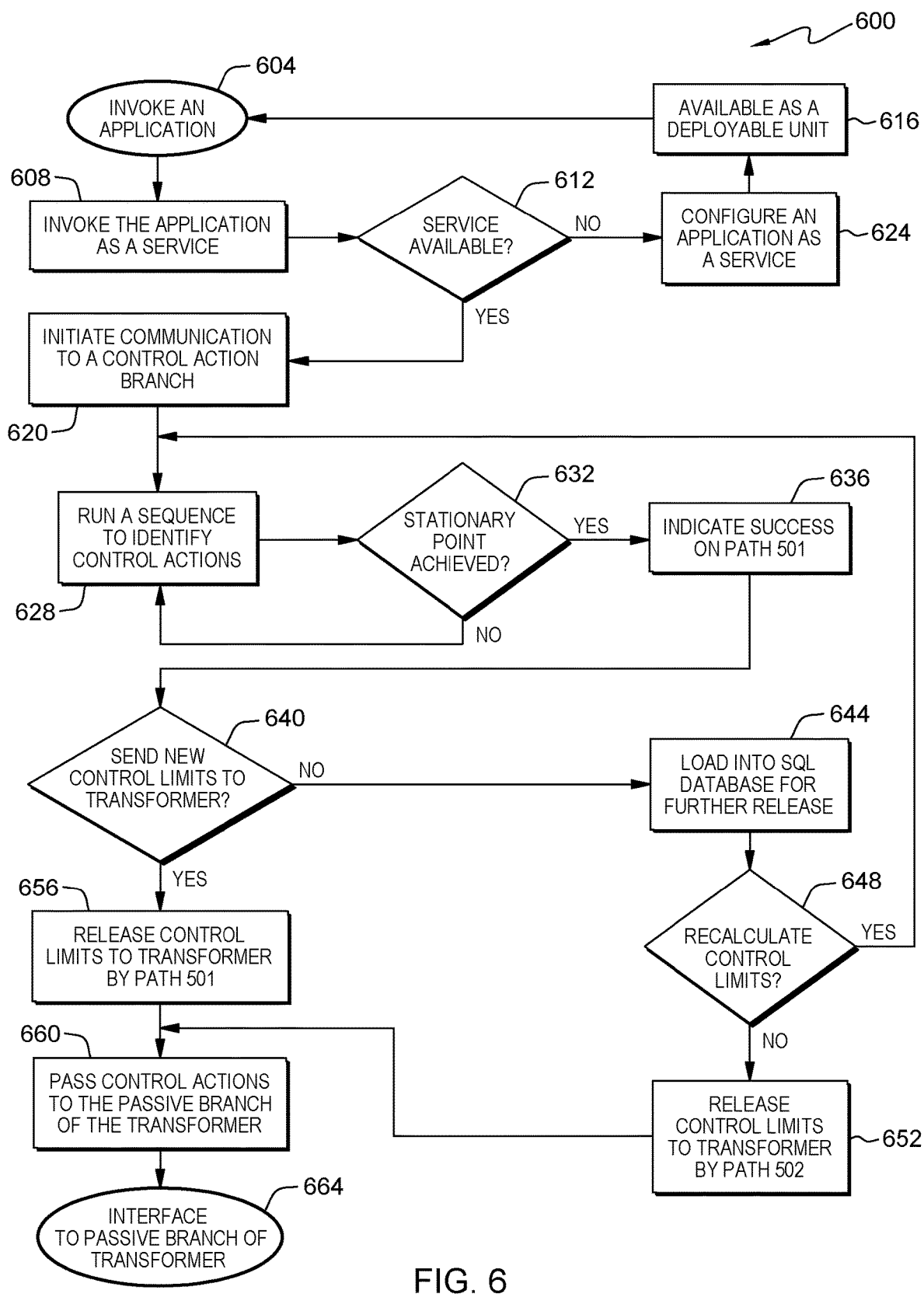
FIG. 6 is a flow chart illustrating another method, which can be implemented, at least in part, in coordination with the system shown in FIG. 1, for generating a model for predicting energy workloads to adjust electrical energy supply to meet varying short-term energy demands at a microcosm level, according to an embodiment of the present disclosure.

Referring to FIG. 5, a first path 501 to load recent value and second path 502 to load last known values are explained further referring to their logic in reference to FIG. 6. A circuit 540 depicts setting new control limit to a passive branch of a transformer 544, referred to as a passive branch offtake circuit 540. The passive branch offtake circuit 540 is connection to pin 532. The passive branch 540 includes an electricity bus and a grid bus having a voltage $V_1$ as opposed to $V_O$ at the other end of the circuit 541. For example, general Pins for Input Output (GPIO) of the processor can include pins 529 and 531 for invoking algorithm on the data storage medium. Pin 507 is connected to path 510, and recent values 504 are loaded to pin 511, for sending calculated control limits to a passive branch 540 of a transformer 544. Pin 522 connects to path 502 and last known values 508 are loaded to pin 516, for sending stored (last best known values) control limits to a passive branch 540 of the transformer 544. Pins 512 and 514 connect to a power supply 550 as an input to the power supply and as an output from the power supply, respectively, such as a 3.4 Volt power supply. Pin 532 is connected to the passive branch offtake circuit 540, as a reset of all values that clear the stored value and input value streams.

Hardware logic of how control limits are set in an electricity bus and a grid bus are ignored as the present embodiment does not alter them or access them. A decision can be determined to load recent values (first path 501) or recent values (path 502) known as last known values to passive branch offtake circuit. The decision can be made considering various factors for instance using the last known values (second path 502) of open market operation has already been committed for the target period or use recent computed values if this is still not committed. These values can be used for further analysis using other systems as well.

Cost barriers and interval constraints can be passed as parametric values set on a web server through a webserver interface. A reference horizon and past values can be available to the program through SQL load functions (for instance through a microcosm of resilient data base structure at transformer level).

Referring to FIG. 6, and FIG. 5, a method 600 according to the present disclosure can include invoking an application stored on computer readable storage medium and executable by a processor, as in block 604, for instance a system on a chip. The application can be invoked as a service, as in block 608, for instance, deployed as on virtual machine.

If a service is available at block 612, the method proceeds to initiate communication to a control action branch, as in block 620. If a service is unavailable at block 612, the method proceeds to configure an application as a service at block 624. And the method proceeds make available as a deployable unit at block 616, for instance as a key, for example, an identity key or a private key, on a server as an authorized key. The method continues to invoke an application at block 604.

From block 620 the method includes running a sequence to identify control actions at block 628. When a stationary point is achieved at block 632, the method proceeds to indicate success on path 501, as in block 636. When a stationary point is not achieved at block 632, the method returns to block 628.

The method includes determining when to send new control limits to a transformer at block 640. When the method determines to send new control limits to a transform at block 640, the method releases control limits to transformer by path 501. The method continues to release control limits to a transformer by path 501 as in block 656. When the method determines to not send new control limits to a transformer 640, the method proceeds to load into a SQL database for further release at block 644.

When the method recalculates control limits at block 648, the method returns to block 628. When the method does not recalculate control limits at block 648 the method continues to release control limits to transformer by path 502, at block 652. The method continues to pass control actions to the passive branch of the transformer at block 660. The method includes continuing to an interface to a passive branch of a transformer at block 664.

In one example, components on a chipset can include an application which includes program instructions to run as a service on a virtual machine, program instructions to build communication, program instructions to run a system on a chip interface with grids passive branch, program instructions to run an HTTP (Hypertext Transfer Protocol) service, program instructions to build an application, program instructions to load data and programs, and program instructions to build an application interface with a grid.

Figure 7:
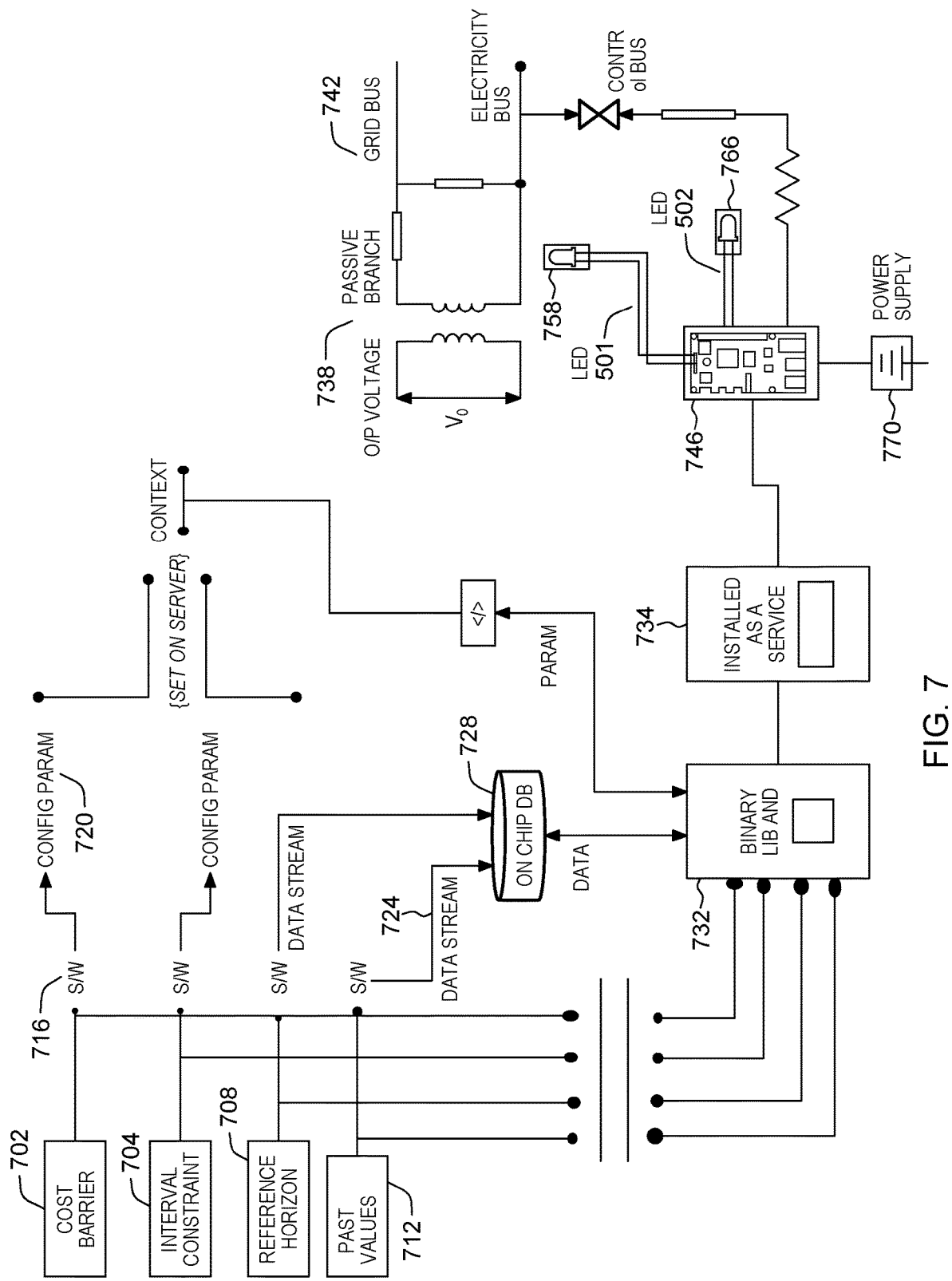
FIG. 7 is a flow chart illustrating another system, which can be implemented, at least in part, in coordination with the systems and methods shown in FIGS. 1, 2, 3, 4, 5 and 6, for generating a model for predicting energy workloads to adjust electrical energy supply to meet varying short-term energy demands at a microcosm level, according to an embodiment of the present disclosure.

Referring to FIG. 7, a system 700 depicts a general interface of how inputs and outputs are gathered and used to set new control limits. The system 700 includes a cost barrier 702 and interval constraint 704, a reference horizon 708, and past values 712. Switches (S/W) 716 communicate with a configuration parameters 720, and data streams 724, and connect to a database 728 communicating with a binary library 732 installed as a service on a chip 734.

Circuit 738 includes a passive branch 742, which communicates with a chip 746 having a processor, and for example, can be a system on a chip. The chip 746 communicates with a first path 501 connected to a first LED (light-emitting diode) 758, and a second path 502 connected to a second LED 766. The chip 746 is also connected to a power supply 770.

Figure 8:
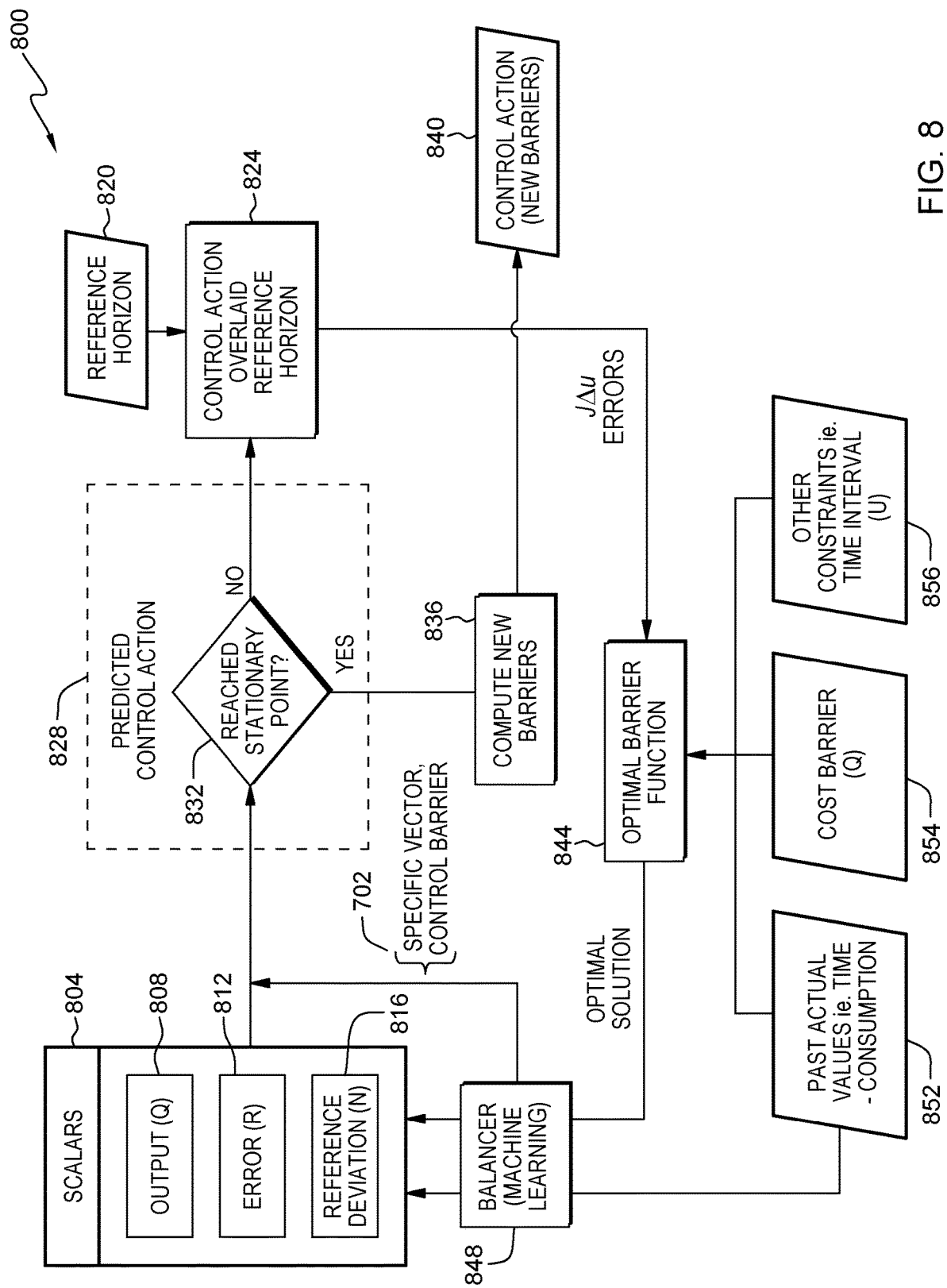
FIG. 8 is a flow chart illustrating another system, which can be implemented, at least in part, in coordination with the systems and methods shown in FIGS. 1, 2, 3, 4, 5 and 6, for generating a model for predicting energy workloads to adjust electrical energy supply to meet varying short-term energy demands at a microcosm level, according to an embodiment of the present disclosure.

Referring to FIG. 8, a system 800 includes an example framework, barrier managed exhaustion (BME), as an iterative model that works independent of time but takes into account the costs, past data and a reference horizon (planned workloads by grid) to create a revised workload plan. The system 800 includes past actual values 852, cost barriers 854, and other constraints 856, which feed into an optimal barrier function 844. A balancer 848 connects to scalars 804 including an output 808, and error 812, and a reference deviation 816. When the system does not reach a stationary point 832, a control action 824 is overlaid with the reference horizon 820. When the system does reach a stationary point, new barriers are computed 836 and a control action 840 initiated. An optimal barrier function communicates with the balancer 848.

In one example of a use case of a transformer can include a transformer ID (identification) equal to xyz. Horizon Data can include a grid's forecast demand for a date and time equal to an amount in Megawatts. Other sample demand data for the date can include time periods with usage amounts in Megawatts. Barriers can have a cost (Unit), and a fluctuating time required by a transformer, for example, in seconds.

The system 800 can compare the predicated output barrier produced by a balancer and compare it with statuary point which will define if it needs to be more optimized or not? The overlay of predicated barriers with horizon data, and can produce an error which will be used as barrier (constraints) for a next cycle of computing the predicted output barrier. For example, a first cycle predicting a demand, then a second cycle predicting a second demand, a third cycle predicting a third demand (the constraints are reaching out to a limit), hence providing a new control action of a demand in Megawatts for this example.

Continuing regarding the system 800, a barrier managed exhaustion (BME) framework can be directed to a large system with multiple parts that exhibit slow dynamics. To model such a behavior, the present system implements a control strategy being referred to as barrier managed exhaustion (BME). The inputs are reference peak and workloads which act as control actions that predict the revised barriers and workloads that are based on the past data. And input include reference horizon of power demand created and maintained by the grid and limiting constrains such as discrete time intervals and non-reversable and harmonic fluctuating solutions.

One advantage of using BME, as compared to other control strategies, is its inherent use of a multi-variable model to adjust control actions (manipulated inputs), and predict the effect of loads (disturbance variables) on outputs (controlled variables). The BME multi-variable model prediction determines whether some variables will reach their limits along the prediction horizon. The BME core framework provides a sequence of control action moving along a control horizon (Nc) such that a cost function defined along a reference horizon (Np) is minimized. All available past and present measurements are provided to the optimal barrier function to seek a minimum cost. This minimum is subject to the balancer imposes on the control action moves, and the controlled variables.

A framework definition, for example, parts of a barrier managed exhaustion framework can include control variables that are predicted control actions and are denoted by Jy and would work on the reference horizon Np, represented by, for example, Equation 1:

$$J_y(k|k) = Q \cdot \sum_{i=1}^{N_p} |\hat{y}(k+i|k) - r_y(k+i|k)|^2$$

In the above Equation 1: 'k' is the current sample time, $\hat{y}$ is the predicted control actions that evaluates 'i' samples of future equivalent of 'k', $r_y$ is the expected control barriers that evaluates 'i' samples of future equivalent of 'k', Q is a balance weight matrix that penalizes the error of $\hat{y}-r_y$.

Input costs are denoted by Ju and would work on the control horizon Nc, represented by, for example, Equation 2:

$$J_u(k|k) = N \cdot \sum_{i=1}^{N_c-1} |u(k+i|k) - r_y(k+i|k)|^2$$

In the above equation 2: 'u' is the input cost that evaluates 'i' samples of future equivalent of 'k', $r_u$ is the expected input cost that evaluates 'i' samples of future equivalent of 'k', N is a balance weight matrix that penalizes the error of u-$r_u$.

Predicted control barriers are denoted by $J_{\Delta u}$ and would work on the control horizon Nc, represented by, for example, Equation 3:

$$J_{\Delta u}(k|k) = R \cdot \sum_{i=1}^{N_c-1} |\Delta u(k+i|k)|^2$$

In the above equation 3: '$\Delta u$' is the expected control barriers that evaluates 'i' samples of future equivalent of 'k', R is a balance weight matrix that penalizes the input barriers.

The overall barriers for the workloads are then given by J as, for example, Equation 4, represented by:

$$J=J_y(k|k)+J_u(k|k)+J_{\Delta u}(k|k)$$

Horizons and balancers (Machine learning aspect) can include, for example, a control horizon Nc used in $J_{\Delta u}(k|k)$ because $\Delta u(k+i|k)=0$ for i≥NC while NP≥NC.

The weights matrices Q, R and N are adjusted to emphasize the effect of the different variables in the optimal solution. Because such balancers are either positive or positive semi-definite, the overall cost J is a strictly convex function, as represented, for example, in Equation 5.

$$\|\Delta u(k,N_p)\|\neq 0 \forall [\Delta u^T(k, N_p)=\{\Delta u^T(k|k) \ldots \Delta u^T(k+N_p|k)\}]$$

Thus, from Equation 5, Equation 6 below:

$$\nabla J=0 \rightarrow \nabla_{\nabla u}(J_y)+\nabla_{\nabla u}(J_u)+\nabla_{\nabla u}(J_{\nabla u})=0$$

Equation 6 will solve a stationary point of the convex function which will represent the optimal revised barrier in the linear function plane. An input as a function of a control action can be represented, for example, as follows in Equation 7:

$$u(k, N_p)=(\Gamma_{N_p} \otimes I_{N_u})\Delta u(k, N_p)+(1_{N_p} \otimes I_{N_u})u(k-1)$$

In Equation 7, $\Gamma_{N_p}$ is lower triangular square matrix of 1s, 1 is a column vector of ones I is the identity matrix.

A stationary point, can be represented, for example, in one solution of Equation 6, as in Equation 8 which can be obtained in the following roots (assuming symmetric weights):

$$\nabla_{\nabla u}(J_y)=\Im^T(\nabla u) \cdot Q_n \cdot \hat{e}_y(k, N_p)$$

$$\nabla_{\nabla u}(J_u)=(\Im_{N_p} \otimes I_{N_u}) \cdot N_n \cdot \hat{e}_u(k, N_C)$$

$$\nabla_{\nabla u}(J_{\nabla u})=R \cdot \Delta u(k, N_p)$$

In Equation 8, $\Im^T$ is Jacobian transpose evaluated at all operating points, $\hat{e}_y$ is output error vector, $\hat{e}_u$ is input error vector.

More Examples and Embodiments

Operational blocks shown in one or more of the figures may be similar to operational blocks in other figures. For example, the method shown in FIG. 4 is intended as another example embodiment which can include aspects/operations shown and discussed previously in the present disclosure.

In one example, according to embodiments of the present disclosure, a method and system focusses on a provider side solution. A model can bring in an overall grid level parameters to provide efficient prediction by pushing edge computing on the grid which revolutionizes the load visibility and prediction. Thereby, the method and system can solve a problem to drive short-term energy efficiencies in electricity transmission using a BME framework that makes use of past values (historic data), associated penalties, and other constraints to predict a peak value. Embodiments of the present disclosure are based on extending digital hardware that has an ability to interface with a MicroSD for applying an algorithm to drive operational efficiencies. The algorithm can use a multi-variable model to adjust control actions based on a reference horizon, past values and dynamic values of barriers. The embodiments of the present disclosure can be based on a barrier managed exhaustion framework that is using a novel circuit at a transformer level with an ability of improvising operations to act upon the impacts created by the levied penalties. This enables making use of a multi-variable model to adjust control actions (manipulated inputs) and predict the effect of loads (disturbance variables) on outputs (controlled variables). The model defined in a BME framework provides a sequence of control action moves along a control horizon such that a cost function defined along a reference horizon is minimized.

In another example according to the present disclosure, a method and system can drive short-term energy efficiencies in electricity transmission by employing a digital hardware and a dynamic operation management algorithm by considering peaks/workloads at a microcosm level for creating a revised demand profile to supply during an energy gap. More specifically, the method and system can include identifying references disclosing features such as, providing a design by considering a subset of past values (historic data), associated penalties, and other constraints to predict a peak value. Additionally, the method and system can include implementing optimal operational actions for short-term energy planning and management at a transformer based on inputs as various barriers, past real data, and cost barrier; and providing abilities for improvised operations to act upon impacts created by levied penalties. The method and system can include setting control limits to a passive branch of the transformer and accepting all dynamic values of barriers as input parameter values set on a web server through an interface.

In another example of an embodiment according to the present disclosure, a method can include creating an integrated model and a role-based management of a microgrid based on real-time power management and generating predicted data for the microgrid by utilizing a virtual system model of the microgrid. A method can include initiating a calibration and a synchronization operation to update the virtual system model based on difference between the predicted data and real-time data from the microgrid. In addition, a method can include generating a naive model from non-outlier values and utilize interpolation along with the naive model to fill in gaps in making load predictions. A method can include driving short-term energy efficiencies in an electricity transmission by employing a digital hardware and a dynamic operation management algorithm for creating a revised demand profile to supply during an energy gap.

Additional Examples and Embodiments

Figure 9:
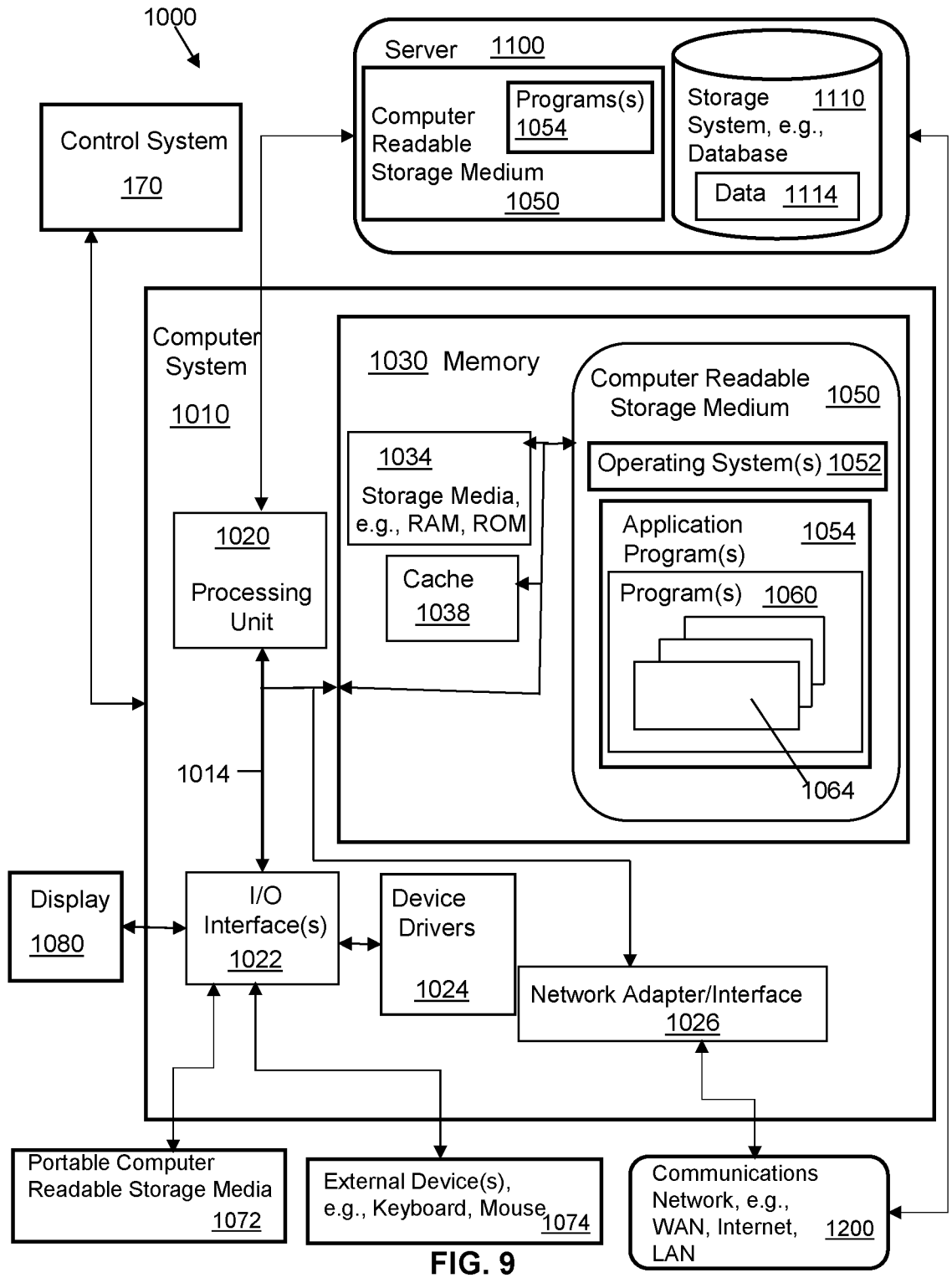
FIG. 9 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 9). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 9 and described in more detail in regards thereto referring to one or more computer systems 1010.

Thus, in one example, a control system 170 is in communication with the computer 130, and the computer can include the application or software 140. The computer 130, or a computer in a mobile device (not shown) communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 9 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 140. In one example, the application 140 is stored on a device, for example, a computer or device on location 130, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device and computer 130 having the application 140. The application 140 is stored on the device or computer 130 and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any energy end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for a learning model for analyzing data associated with items and assets.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 9, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 10:
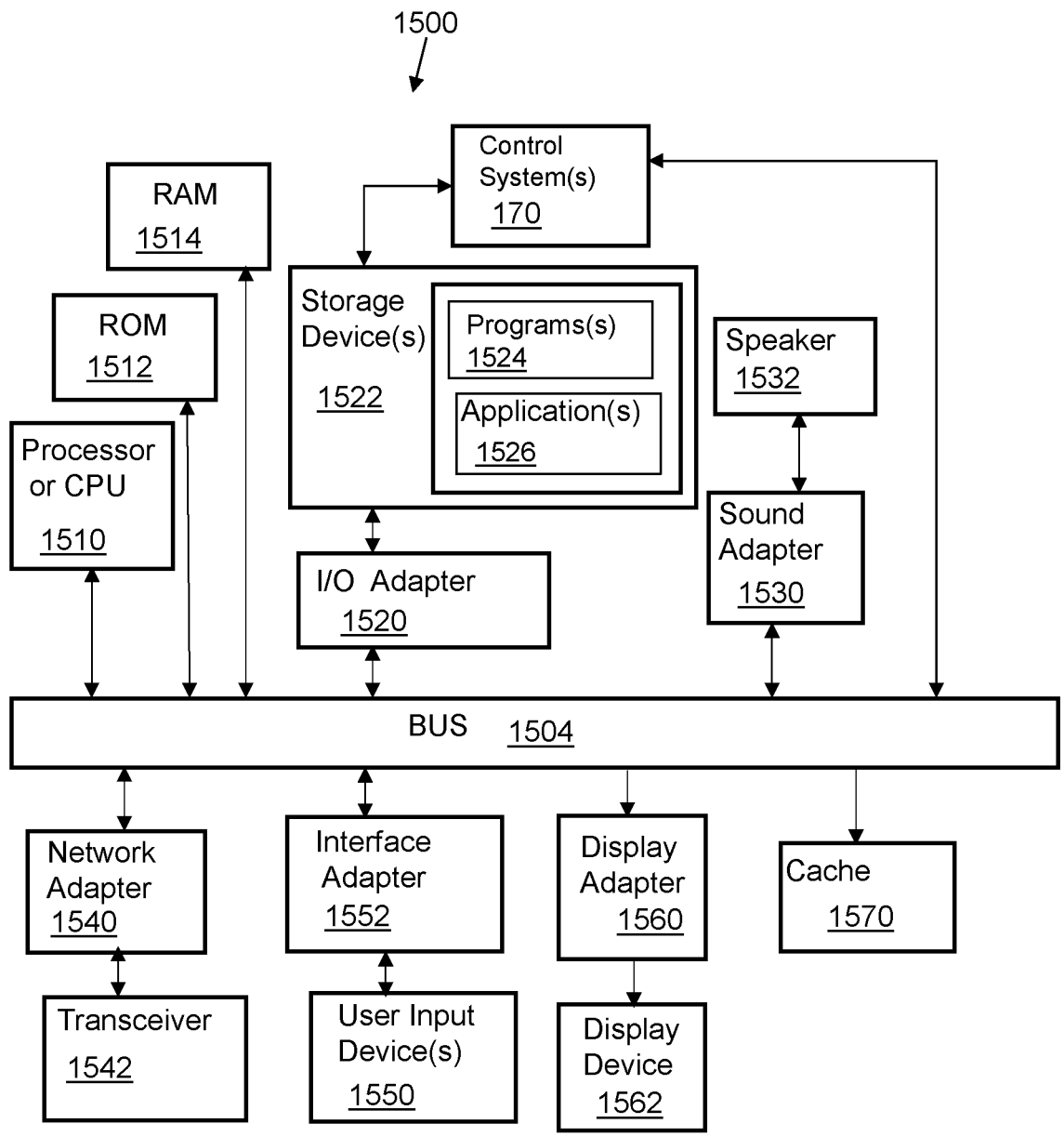
FIG. 10 is a schematic block diagram of a system depicting system components interconnected using a bus. The components for use, in all or in part, with the embodiments of the present disclosure, in accordance with one or more embodiments of the present disclosure.

Referring to FIG. 10, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 70 which communicates with the system bus, and thus can communicate with the other components of the system via the system bus. In one example, the storage device 1522, via the system bus, can communicate with the control system 70 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
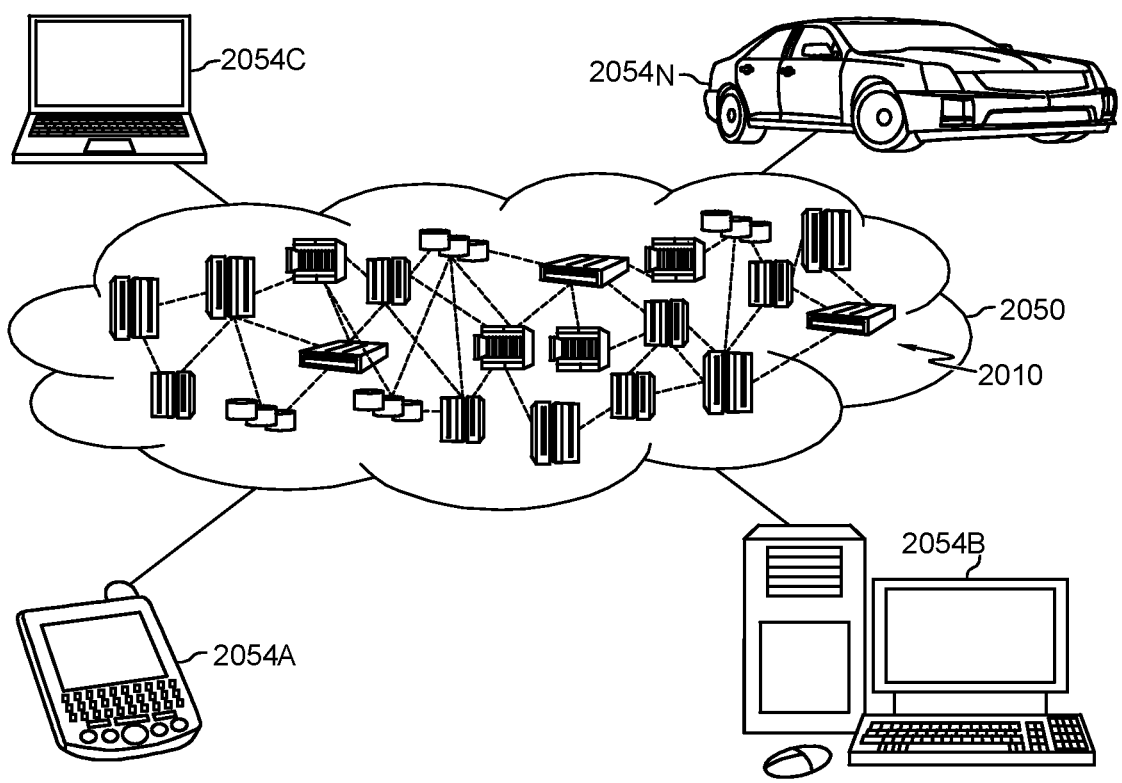
FIG. 11 is a block diagram depicting a cloud computing environment according to an embodiment of the present invention.

Referring now to FIG. 11, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

Figure 12:
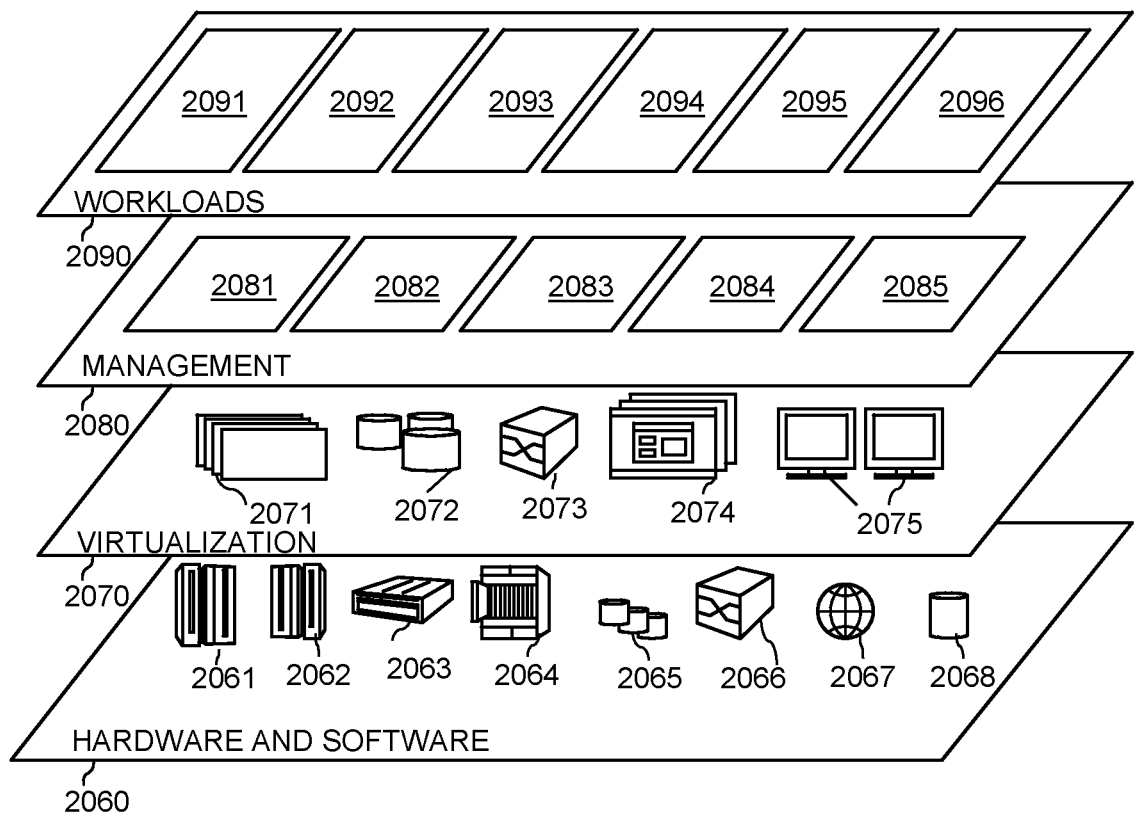
FIG. 12 is a block diagram depicting abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating a computer model 2096, for example, a computer model for predicting electrical workloads in an electrical grid for facilitating management of electrical transmission.

What is claimed is:

1. Computer-implemented method for generating a model for predicting energy workloads to adjust electrical energy supply to meet varying short-term energy demands at a microcosm level, comprising:
 developing a model, using a computer, to facilitate predicting energy workloads for adjusting energy supplies to meet an energy demand, the model includes the following;
 receiving, at the computer, input parameters of dynamic values of workloads as historical data;
 generating a predictive model by analyzing the input parameters;
 predicting short-term energy demands based on the predictive model, the predicted short-term energy demands include identifying a predicted peak value;
 initiating short term energy output in an electrical grid to a component at a transformer level in the electrical grid based on the predicted short-term energy demands; and
 setting a control limit to a passive branch of a transformer circuit as a passive branch offtake circuit electrically connected to a connection pin in a pin header for supply power to the electrical grid, the passive branch offtake circuit including an electricity bus and a grid bus having a voltage $V_1$ which is different than a voltage $V_0$ at another end of the transformer circuit outside of the passive branch offtake circuit.

2. He method of claim 1, wherein the transformer level component is a transformer.

3. The method of claim 1, further comprising:
 initiating the short-term energy output in the electrical grid using an electrical circuit at a transformer level in the electrical grid; and
 dynamically configuring control limits to the component at the transformer level using the electrical circuit.

4. The method of claim 1, further comprising:
 initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

5. The method of claim 1, wherein the input parameters include a subset of past values as at least part of the historical data, and the input parameters include associated penalties and other constraints to identify the predicted peak value.

6. The method of claim 1, wherein the input parameters include a plurality of barriers which include, workloads and peak power outputs, past real data of power usage, and cost parameters.

7. The method of claim 1, wherein the predictive model predicts when variables in the electrical gird will reach specified limits, respectively, along a prediction horizon; and
 the predictive model providing a sequence of control actions to minimize costs, the sequence of control actions corresponding to identified nodes of the prediction horizon, respectively.

8. A system using a computer for generating a model for predicting energy workloads to adjust electrical energy supply to meet varying short-term energy demands at a microcosm level, which comprises:
 a computer system comprising; a computer processor, a computer-readable storage medium, and program instructions stored on the computer-readable storage medium being executable by the processor, to cause the computer system to perform the following functions to;
 develop a model, using a computer, to facilitate predicting energy workloads for adjusting energy supplies to meet an energy demand, the model includes the following;
 receive, at the computer, input parameters of dynamic values of workloads as historical data;
 generate a predictive model by analyzing the input parameters;
 predict short-term energy demands based on the predictive model, the predicted short-term energy demands include identifying a predicted peak value;
 initiate short term energy output in an electrical grid to a transformer level component in the electrical grid based on the predicted short term energy demands; and
 set a control limit to a passive branch of a transformer circuit as a passive branch offtake circuit electrically connected to a connection pin in a pin header for supply power to the electrical grid, the passive branch offtake circuit including an electricity bus and a grid bus having a voltage $V_1$ which is different than a voltage $V_0$ at another end of the transformer circuit outside of the passive branch offtake circuit.

9. The system of claim 8, wherein the transformer level component is a transformer.

10. The system of claim 8, further comprising:
 initiating the short-term energy output in the electrical grid using an electrical circuit at a transformer level in the electrical grid; and
 dynamically configuring control limits to the transformer using the electrical circuit.

11. The system of claim 8, further comprising:
 initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

12. The system of claim 8, wherein the input parameters include a subset of past values as at least part of the historical data, and the input parameters include associated penalties and other constraints to identify the predicted peak value.

13. The system of claim 8, wherein the input parameters include a plurality of barriers which include, workloads and peak power outputs, past real data of power usage, and cost parameters.

14. The system of claim 8, wherein the predictive model predicts when variables in the electrical gird will reach specified limits, respectively, along a prediction horizon; and
 the predictive model providing a sequence of control actions to minimize costs, the sequence of control actions corresponding to identified nodes of the prediction horizon, respectively.

15. Computer program product for predicting energy workloads to adjust electrical energy supply to meet varying short-term energy demands at a microcosm level, the computer program product comprising a computer readable storage medium having program instructions embodied therewith, the program instructions executable by a computer to cause the computer to perform functions, by the computer, comprising the functions to:
- develop a model, using a computer, to facilitate predicting energy workloads for adjusting energy supplies to meet an energy demand, the model includes the following;
- receive, at the computer, input parameters of dynamic values of workloads as historical data;
- generate a predictive model by analyzing the input parameters;
- predict short-term energy demands based on the predictive model, the predicted short-term energy demands include identifying a predicted peak value;
- initiate short term energy output in an electrical grid to a transformer level component in the electrical grid based on the predicted short term energy demands; and
- set a control limit to a passive branch of a transformer circuit as a passive branch offtake circuit electrically connected to a connection pin in a pin header for supply power to the electrical grid, the passive branch offtake circuit including an electricity bus and a grid bus having a voltage $V_1$ which is different than a voltage $V_0$ at another end of the transformer circuit outside of the passive branch offtake circuit.

16. The computer program product of claim 15, wherein the transformer level component is a transformer.

17. The computer program product of claim 15, further comprising:
- initiating the short-term energy output in the electrical grid using an electrical circuit at a transformer level in the electrical grid; and
- dynamically configuring control limits to the transformer using the electrical circuit.

18. The computer program product of claim 15, further comprising:
- initiating the short-term energy output in the electrical grid by setting a control limit, using the computer, to a passive branch of a transformer as at least part of an electrical circuit of the electrical grid, the electrical circuit transmitting electricity from a power source to an end user using the electrical grid.

19. The computer program product of claim 15, wherein the input parameters include a subset of past values as at least part of the historical data, and the input parameters include associated penalties and other constraints to identify the predicted peak value.

20. The computer program product of claim 15, wherein the input parameters include a plurality of barriers which include, workloads and peak power outputs, past real data of power usage, and cost parameters.

* * * * *